(12) United States Patent
Sano (10) Patent No.: US 11,639,078 B2
(45) Date of Patent: May 2, 2023

(54) PNEUMATIC TIRE

(71) Applicant: Toyo Tire Corporation, Itami (JP)

(72) Inventor: Shingo Sano, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 189 days.

(21) Appl. No.: 17/110,667

(22) Filed: Dec. 3, 2020

(65) Prior Publication Data

US 2021/0197628 A1   Jul. 1, 2021

(30) Foreign Application Priority Data

Dec. 26, 2019   (JP) .............................. JP2019-236090

(51) Int. Cl.
 *B60C 13/02*   (2006.01)
 *B60C 11/01*   (2006.01)
(52) U.S. Cl.
 CPC .............. *B60C 13/02* (2013.01); *B60C 11/01* (2013.01); *B60C 2200/14* (2013.01)
(58) Field of Classification Search
 CPC .......... B60C 11/01; B60C 13/02; B60C 13/00
 See application file for complete search history.

(56) References Cited

U.S. PATENT DOCUMENTS

| | | | |
|---|---|---|---|
| 2017/0174007 A1* | 6/2017 | Kuwano | ................. B60C 11/01 |
| 2018/0065419 A1* | 3/2018 | Ueda | ....................... B60C 13/02 |
| 2019/0077199 A1* | 3/2019 | Nishikawa | .............. B60C 13/02 |

FOREIGN PATENT DOCUMENTS

JP        2018-39362 A        3/2018

* cited by examiner

*Primary Examiner* — Robert C Dye
*Assistant Examiner* — Nicholas J Weiler
(74) *Attorney, Agent, or Firm* — WHDA, LLP (57) ABSTRACT

In a pneumatic tire, a plurality of side blocks include a first side block and a second side block that are adjacent in a tire circumferential direction, the first side block comprises a first recess that is recessed in a tire width direction and that is disposed at a location which is separated from an edge of an end in the tire circumferential direction of the first side block, and the second side block comprises a first convexity that protrudes in the tire width direction and that is disposed at a location which is separated from an edge of an end in the tire circumferential direction of the second side block.

20 Claims, 5 Drawing Sheets

PNEUMATIC TIRE

CROSS REFERENCE TO RELATED APPLICATIONS

This application claims the benefit of priority of Japanese application no. 2019-236090, filed on Dec. 26, 2019, which is incorporated herein by reference.

BACKGROUND OF THE INVENTION

Field of the Invention

The present disclosure relates to a pneumatic tire.

Description of the Related Art

Conventionally, e.g., in the context of a pneumatic tire, a sidewall region might comprise a plurality of side blocks which are arrayed in the tire circumferential direction (e.g., JP 2018-39362 A). In addition, under bad road conditions such as when the terrain is sandy, rocky, and/or muddy, because traction (nonslipping grabbing force) is produced due to the plurality of side blocks, it is possible to improve driveability under bad road conditions. But in recent years there has been demand for a pneumatic tire that will produce traction in well-balanced fashion regardless of the conditions of the road on which it is ridden (e.g., sandy, rocky, muddy, or other such type thereof).

SUMMARY OF THE INVENTION

It is therefore an object of the present disclosure to provide a pneumatic tire that is capable of producing traction in well-balanced fashion regardless of the conditions of the road on which it is ridden.

There is provided a pneumatic tire comprises at least one sidewall region extending in a tire radial direction;

wherein the at least one sidewall region comprises a plurality of side blocks that are arrayed in a tire circumferential direction;

wherein the plurality of side blocks include a first side block and a second side block that are adjacent in the tire circumferential direction;

wherein the first side block comprises a first recess that is recessed in a tire width direction and that is disposed at a location which is separated from an edge of an end in the tire circumferential direction of the first side block; and wherein the second side block comprises a first convexity that protrudes in the tire width direction and that is disposed at a location which is separated from an edge of an end in the tire circumferential direction of the second side block.

DETAILED DESCRIPTION OF THE INVENTION

Below, an embodiment of a pneumatic tire is described with reference to FIG. 1 through FIG. 5. At the respective drawings, note that dimensional ratios at the drawings and actual dimensional ratios are not necessarily consistent, and note further that dimensional ratios are not necessarily consistent from drawing to drawing.

Figure 1:
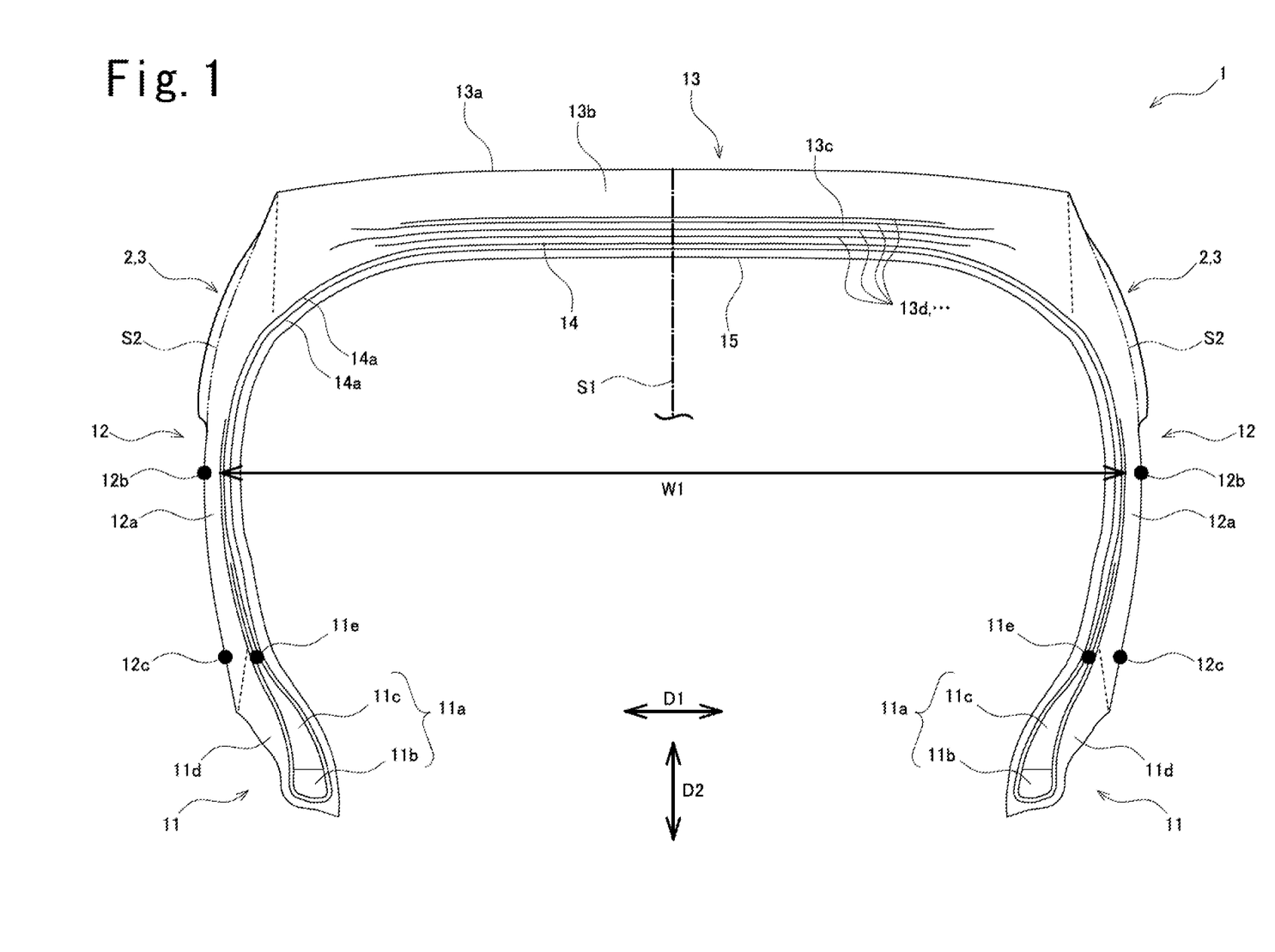
FIG. 1 is a view of a section, taken along a tire meridional plane, of the principal components in a pneumatic tire associated with an embodiment.

As shown in FIG. 1, pneumatic tire (hereinafter sometimes referred to as simply "tire") 1 is provided with a pair of bead regions 11 having beads 11a; sidewall regions that extend toward the exterior in the tire radial direction D2 from respective bead regions 11; and tread region 13 having, at the exterior in the tire radial direction D2, tread surface 13a which comes in contact with the ground and which is coupled to the respective exterior edges in the tire radial direction D2 of the pair of sidewall regions 12. Note that tire 1 may be mounted on a rim (not shown).

Furthermore, tire 1 is provided with carcass layer 14 suspended between pair of beads 11a, 11a; and inner-liner layer 15 that is arranged toward the interior from carcass layer 14 and that faces the interior space of tire 1 which is or will be filled with air. Carcass layer 14 and inner-liner layer 15 are arranged in parallel fashion with respect to the inner circumferential surface of the tire over a portion thereof that encompasses bead regions 11, sidewall regions 12, and tread region 13.

At the respective drawings, first direction D1 is the tire width direction D1 which is parallel to the rotational axis of the tire, second direction D2 is the tire radial direction D2 which is the direction of the diameter of tire 1, and third direction D3 is the tire circumferential direction D3 which is the direction that is circumferential about the rotational axis of the tire. Furthermore, tire equatorial plane S1 is a plane that is located centrally in the tire width direction D1 and that is perpendicular to the rotational axis of the tire; tire meridional planes are planes that are perpendicular to tire equatorial plane S1 and that contain the rotational axis of the tire.

In the tire width direction D1, the side toward the interior is the side which is nearer to tire equatorial plane S1, and the side toward the exterior is the side which is farther from tire equatorial plane S1. Furthermore, in the tire radial direction D2, the side toward the interior is the side which is nearer to the tire rotational axis, and the side toward the exterior is the side which is farther from the tire rotational axis.

Bead 11a is provided with bead core 11b which is formed so as to be annular in shape, and bead filler 11c which is arranged toward the exterior in the tire radial direction D2 from bead core 11b. For example, bead core 11b might be formed by laminating rubber-covered bead wire(s) (e.g., metal wire(s)), and bead filler 11c might be formed from hard rubber that has been made to taper as one proceeds toward the exterior in the tire radial direction D2.

Bead region 11 is provided with rim strip rubber 11d which is arranged toward the exterior in the tire width direction D1 from carcass layer 14 and which is intended to constitute the outer surface that will come in contact with the rim. Sidewall region 12 is provided with sidewall rubber 12a which is arranged toward the exterior in the tire width direction D1 from carcass layer 14 and which is intended to constitute the outer surface.

Tread region 13 is provided with tread rubber 13b at which the outer surface constitutes tread surface 13a, and belt region 13c which is arranged between tread rubber 13b and carcass layer 14. Belt region 13c is provided with a plurality (four at FIG. 1) belt plies 13d. For example, belt plies 13d might be provided with a plurality of belt cords (e.g., organic fiber and/or metal) which are arrayed in parallel fashion, and topping rubber with which the belt cords are covered.

Carcass layer 14 is made up of at least one (two at FIG. 1) carcass ply 14a. Carcass ply 14a folds back upon itself and wraps about bead 11a so as to envelop bead 11a. Furthermore, carcass ply 14a is provided with a plurality of ply cords (e.g., organic fiber and/or metal) which are arrayed in direction(s) more or less perpendicular to the tire circumferential direction D3, and topping rubber with which the ply cords are covered.

Inner-liner layer 15 has superior functionality in terms of its ability to impede passage of gas therethrough so as to permit air pressure to be maintained. At sidewall region 12, note that inner-liner layer 15 is in intimate contact with the inside circumferential surface of carcass layer 14, there being no other member that intervenes between inner-liner layer 15 and carcass layer 14.

For example, distance between the inner circumferential surface of the tire (inner circumferential surface of inner-liner layer 15) and the carcass ply 14a which is arranged nearest to the inner circumferential surface might be 90% to 180% at sidewall region 12 of what it is at tread region 13. More preferably, this distance might be 120% to 160% at sidewall region 12 of what it is at tread region 13.

Sidewall regions 12 are such that provided at the outer surface thereof are locations 12b which are at the same locations in the tire radial direction D2 as the locations at which tire width is a maximum (more specifically, the locations at which distance W1 between respective exterior points in the tire width direction D1 of carcass layer 14 is a maximum). Below, these locations 12b are referred to as tire maximum width locations 12b.

Furthermore, sidewall regions 12 are such that provided at the outer surface thereof are locations 12c which are at the same locations in the tire radial direction D2 as exterior edges 11e of bead filler 11c in the tire radial direction D2. Below, these locations 12c are referred to as bead edge locations 12c.

Figure 2:
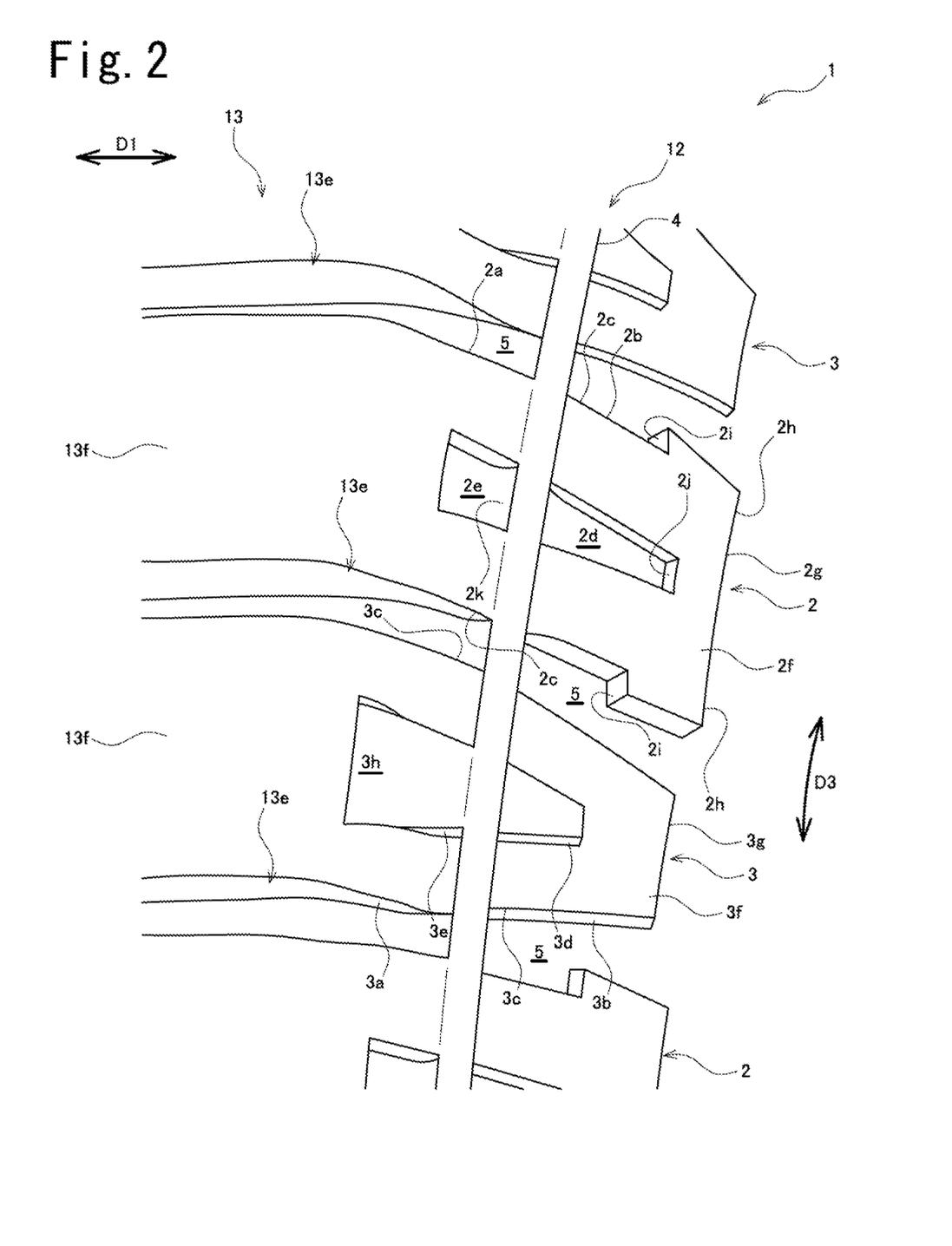
FIG. 2 is a perspective view of the principal components in a pneumatic tire associated with same embodiment.
Figure 3:
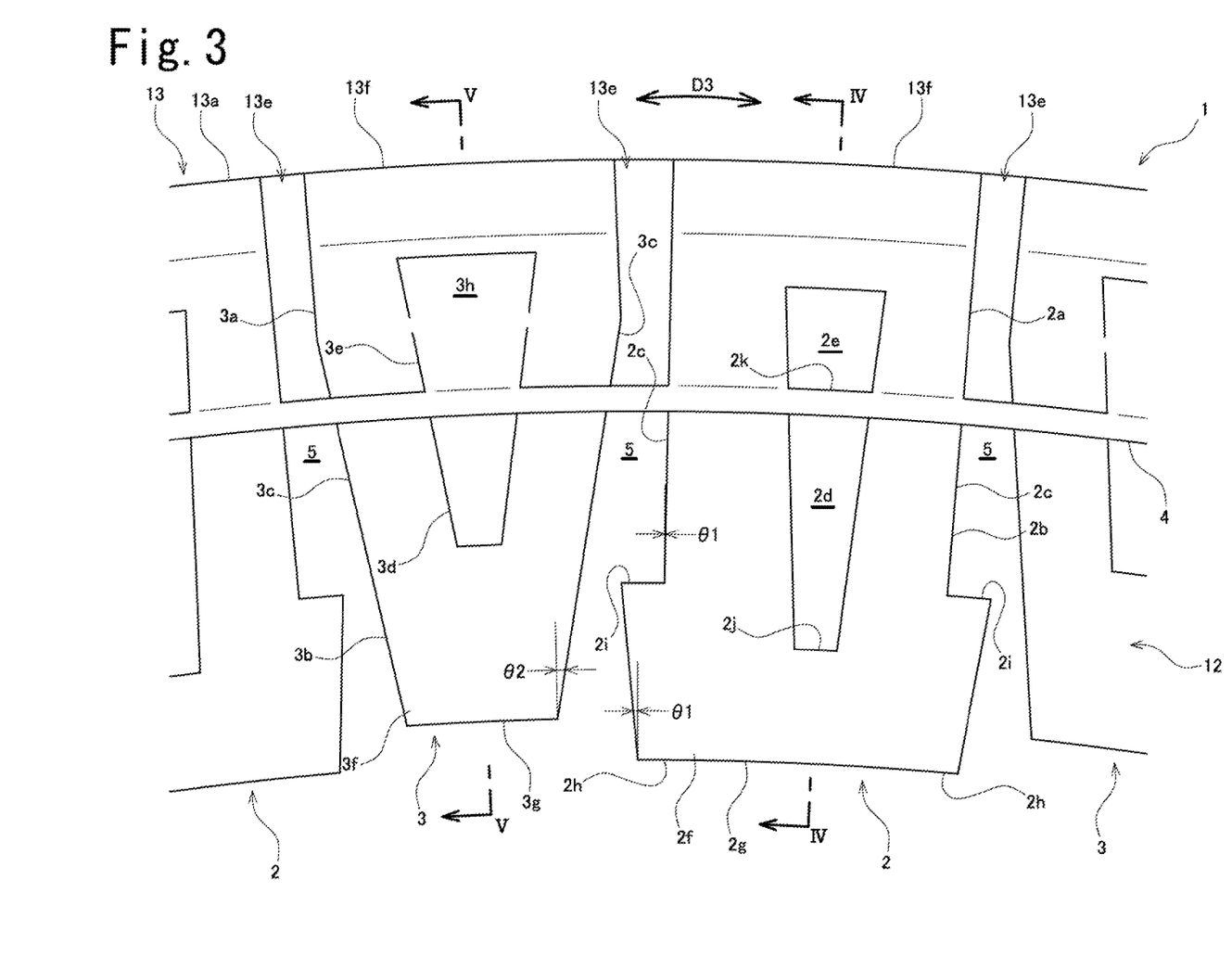
FIG. 3 is a side view (drawing as viewed in the tire width direction) of the principal components of a pneumatic tire associated with same embodiment.

As shown in FIG. 2 and FIG. 3, tread region 13 comprises a plurality of grooves 13e extending to the outer end in the tire width direction D1, and a plurality of tread blocks 13f partitioned by the plurality of grooves 13e. The plurality of tread blocks 13f are arranged so as to be arrayed in the tire circumferential direction D3.

Sidewall region 12 comprises a plurality of side blocks 2, 3 which protrude in the tire width direction D1, and annular projection(s) 4 which protrude in the tire width direction D1 and which extend in the tire circumferential direction D3. Side blocks 2, 3 are arranged so as to be arrayed in the tire circumferential direction D3, and annular projection(s) 4 cause side blocks 2, 3 which are adjacent in the tire circumferential direction D3 to be mutually connected. Note that sidewall region 12 may also be constituted such that it does not comprise annular projection(s) 4.

Side blocks 2, 3 have surface and edge components. In addition, at locations where contact with the ground takes place at mud, sand, or rock, formation of irregular shapes permits increase in the area over which contact with the ground occurs at mud, sand, or rock; furthermore, surfaces and edges resulting from such irregular shapes facilitate contact with the ground at mud, sand, or rock at a variety of locations. In this way, formation of irregular shapes at locations where contact with the ground takes place at mud, sand, or rock improves traction capability.

In addition, side blocks 2, 3 are arranged at least at the exterior in the tire radial direction D2 of sidewall regions 12. While there is no particular limitation with respect thereto, side blocks 2, 3 might, for example, arranged toward the exterior in the tire radial direction D2 from bead end locations 12c (see FIG. 1) of sidewall regions 12. Furthermore, side blocks 2, 3 might, for example, arranged toward the exterior in the tire radial direction D2 from tire maximum width locations 12b (see FIG. 1) of sidewall regions 12.

As a result, under muddy and/or sandy conditions, when the weight of the vehicle causes tire 1 to sink such that it is buried under mud and/or sand, side blocks 2, 3 are able to come in contact with the ground; and under rocky conditions, side blocks 2, 3 are able to come in contact with irregular surfaces of rocks. That is, side blocks 2, 3 come in contact with the ground under bad road conditions such as when the terrain is muddy, sandy, and/or rocky. Note that side blocks 2, 3 do not come in contact with the ground during normal travel on a flat road.

Furthermore, sidewall region 12 comprises gap region 5 which is between side blocks 2, 3 and which is constituted from side blocks 2, 3. In addition, gap region 5 is contiguous with groove 13e. As a result, at least a portion of side blocks 2, 3 and at least a portion of tread blocks 13f will be arranged at the same location(s) in the tire circumferential direction D3. While there is no particular limitation with respect thereto, in accordance with the present embodiment, the number of side blocks 2, 3 is the same as the number of tread blocks 13f.

The plurality of side blocks 2, 3 include first side blocks 2 and second side blocks 3 which are adjacent in the tire circumferential direction D3. First side blocks 2 and second side blocks 3 are arranged in alternating fashion in the tire circumferential direction D3. In addition, side blocks 2, 3 comprise outer portions 2a, 3a which are arranged toward the exterior in the tire radial direction D2 from annular projection(s) 4, and inner portions 2b, 3b which are arranged toward the interior in the tire radial direction D2 from annular projection(s) 4.

The constitution of first side block 2 will now be described with reference to FIG. 2 through FIG. 4.

Figure 4:
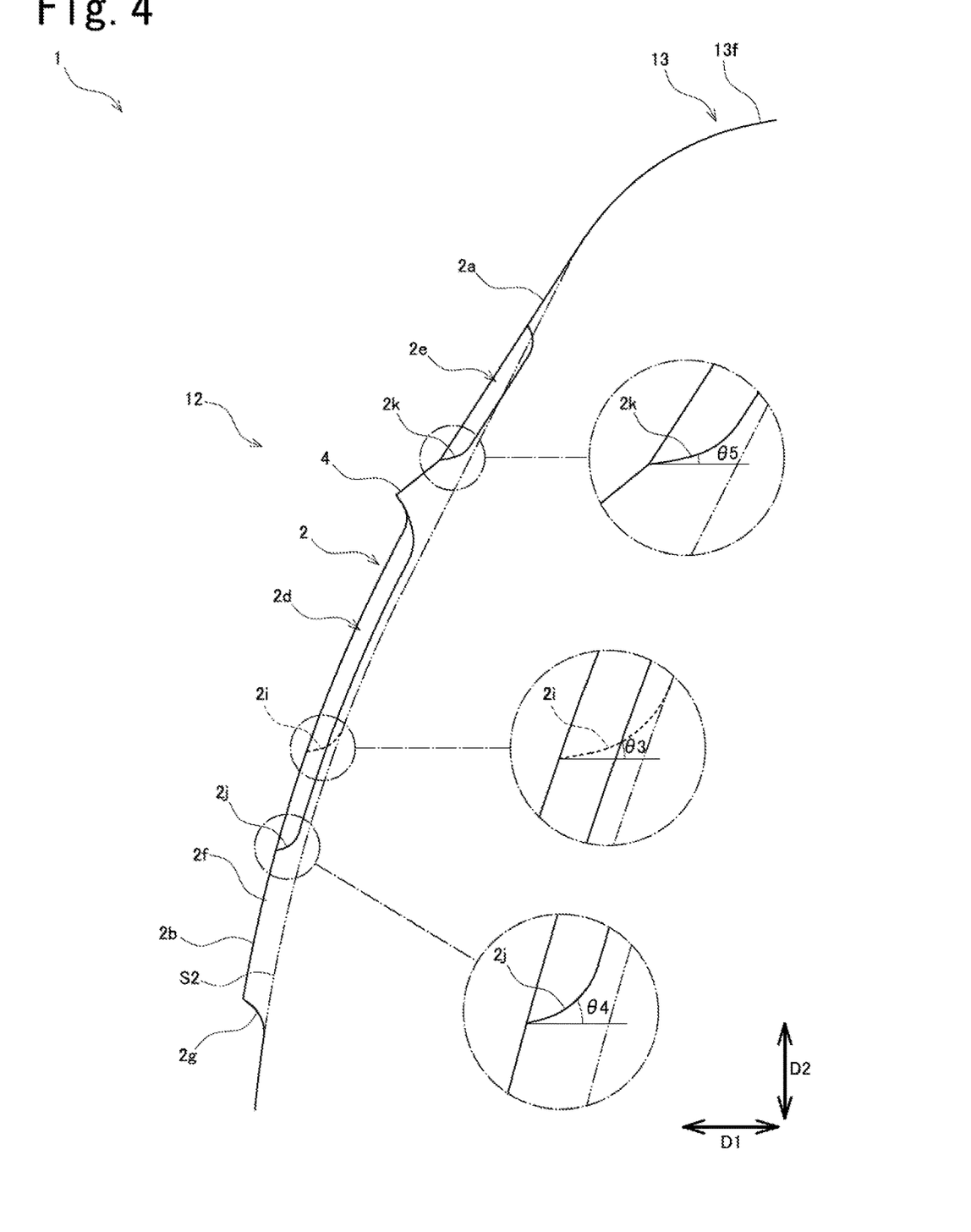
FIG. 4 is an enlarged view (drawing taken along the tire meridional plane) of the principal components in a section taken along IV-IV in FIG. 3.

As shown in FIG. 2 through FIG. 4, first side block 2 comprises a plurality of recesses 2d, 2e that are recessed in the tire width direction D1 and that are disposed at locations which are separated from edges 2c of ends in the tire circumferential direction D3 of first side block 2. More specifically, first side block 2 comprises main portion 2f which protrudes therefrom in the tire width direction D1, and recesses 2d, 2e that are recessed relative to main portion 2f and that are disposed at locations which are separated from edges 2c of ends in the tire circumferential direction D3 of main portion 2f.

In addition, the plurality of recesses 2d, 2e include first recess 2d which is arranged at inner portion 2b of first side block 2, and second recess 2e which is arranged at outer portion 2a of first side block 2. Furthermore, while there is no particular limitation with respect thereto, in accordance with the present embodiment, recesses 2d, 2e are arranged at locations which are separated from edge 2g of the inner end in the tire radial direction D2 of first side block 2. Moreover, while there is no particular limitation with respect thereto, in accordance with the present embodiment, main portion 2f comprises protrusions $2h$, $2h$ which protrude in the tire circumferential direction D3 at the inner end in the tire radial direction D2 thereof.

Furthermore, first side block 2 comprises a plurality of outward facing surfaces $2i$, $2j$, $2k$ which face the exterior in the tire radial direction D2. The plurality of outward facing surfaces $2i$, $2j$, $2k$ include first outward facing surface $2i$ and second outward facing surface $2j$ which are arranged at inner portion $2b$ of first side block 2, and third outward facing surface $2k$ which is arranged at outer portion $2a$ of first side block 2.

First outward facing surface $2i$ is arranged at the outer end in the tire radial direction D2 of protrusion $2h$, second outward facing surface $2j$ is arranged at the inner end in the tire radial direction D2 of first recess $2d$, and third outward facing surface $2k$ is arranged at the inner end in the tire radial direction D2 of second recess $2e$. While there is no particular limitation with respect thereto, in accordance with the present embodiment, note that first outward facing surface $2i$ is contiguous with edge $2c$ of end in the tire circumferential direction D3 of first side block 2, and second outward facing surface $2j$ and third outward facing surface $2k$ are separated from edges $2c$ of ends in the tire circumferential direction D3 of first side block 2.

In addition, first outward facing surface $2i$, second outward facing surface $2j$, and third outward facing surface $2k$ are respectively separated from each other in the tire radial direction D2. That is, first outward facing surface $2i$, second outward facing surface $2j$, and third outward facing surface $2k$ are arranged at respectively different locations in the tire radial direction D2. While there is no particular limitation with respect thereto, as viewed in a tire meridional section, note that the angles of inclination $\theta 3$, $\theta 4$, and $\theta 5$ of outward facing surfaces $2i$, $2j$, $2k$ with respect to the tire width direction D1 might, for example, be not greater than 45°; or might, for example, be not greater than 30°; or might, for example, be not greater than 15°.

Next, the constitution of second side block 3 will be described with reference to FIG. 2, FIG. 3, and FIG. 5.

Figure 5:
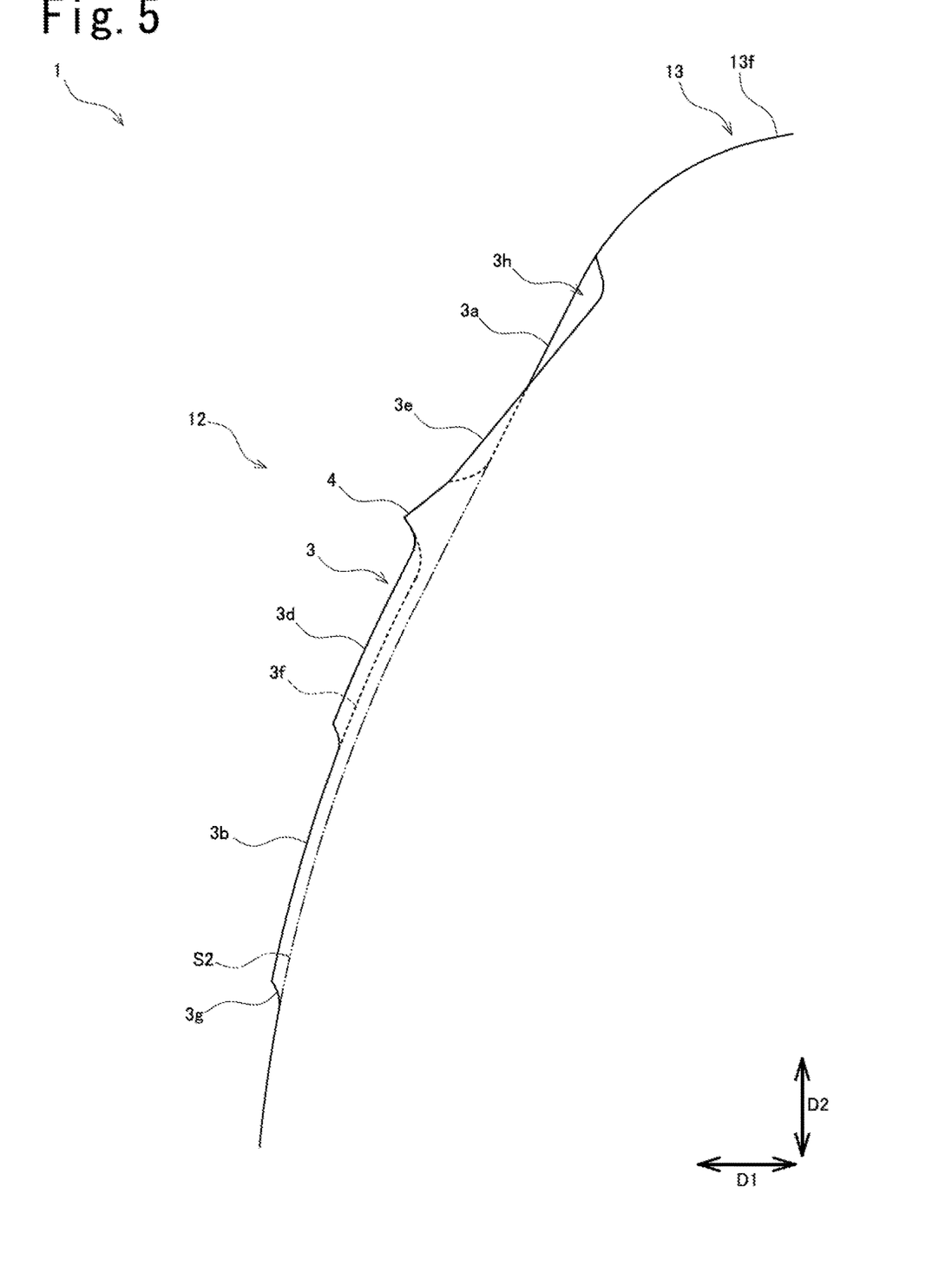
FIG. 5 is an enlarged view (drawing taken along the tire meridional plane) of the principal components in a section taken along V-V in FIG. 3.

As shown in FIG. 2, FIG. 3, and FIG. 5, second side block 3 comprises a plurality of convexities $3d$, $3e$ that protrude in the tire width direction D1 and that are disposed at locations which are separated from edges $3c$ of ends in the tire circumferential direction D3 of second side block 3. More specifically, second side block 3 comprises main portion $3f$ which protrudes therefrom in the tire width direction D1, and convexities $3d$, $3e$ that protrude from main portion $3f$ and that are disposed at locations which are separated from edges $3c$ of ends in the tire circumferential direction D3 of main portion $3f$.

The plurality of convexities $3d$, $3e$ include first convexity $3d$ which is arranged at inner portion $3b$ of second side block 3, and second convexity $3e$ which is arranged at outer portion $3a$ of second side block 3. Moreover, while there is no particular limitation with respect thereto, in accordance with the present embodiment, convexities $3d$, $3e$ are arranged at locations which are separated from edge $3g$ of the inner end in the tire radial direction D2 of second side block 3.

Furthermore, second side block 3 comprises recess $3h$ that is recessed in the tire width direction D1 and that is disposed at a location which is separated from edges $3c$ of ends in the tire circumferential direction D3 of second side block 3. Recess $3h$ is recessed relative to main portion $3f$. In addition, recess $3h$ is arranged at a location which is separated from edge $3g$ of the inner end in the tire radial direction D2 of second side block 3.

More specifically, recess $3h$ is arranged at outer portion $3a$ of second side block 3. In addition, recess $3h$ is arranged at a location which is toward the exterior in the tire radial direction D2 from convexities $3d$, $3e$. While there is no particular limitation with respect thereto, in accordance with the present embodiment, note that recess $3h$ is contiguous with the outer end in the tire radial direction D2 of second convexity $3e$.

Next, the constitutions of first side block 2 and second side block 3 will be described with reference to FIG. 3 through FIG. 5.

As shown in FIG. 3, at least a portion of recesses $2d$, $2e$ and at least a portion of convexities $3d$, $3e$ are arranged at the same location(s) in the tire radial direction D2. More specifically, first convexity $3d$ is arranged at the same location in the tire radial direction D2 as a portion of first recess $2d$, and second convexity $3e$ is arranged at the same location in the tire radial direction D2 as a portion of second recess $2e$.

Furthermore, edge $2c$ of end in the tire circumferential direction D3 of first side block 2 (inner portion $2b$) is inclined by first angle of inclination $\theta 1$ with respect to the tire radial direction D2, and edge $3c$ of end in the tire circumferential direction D3 of second side block 3 (inner portion $3b$) is inclined by second angle of inclination $\theta 2$ with respect to the tire radial direction D2. Note that the tire radial direction D2 which serves as reference surface is taken to be that tire radial direction D2 which passes through (includes) the inner end in the tire radial direction D2 of end edge $2c$, $3c$.

In addition, first angle of inclination $\theta 1$, $\theta 1$ is less than second angle of inclination $\theta 2$. While there is no particular limitation with respect thereto, note that first angle of inclination $\theta 1$ might, for example, be not greater than 15°; or might, for example, be not greater than 10°; or might, for example, be not greater than 5°. Furthermore, while there is no particular limitation with respect thereto, second angle of inclination $\theta 2$ might, for example, be not greater than 15°; or might, for example, be not greater than 10°.

Furthermore, while there is no particular limitation with respect thereto, in accordance with the present embodiment, the inner end portion in the tire radial direction D2 of gap region 5 is formed so as to become wider as one proceeds toward the interior in the tire radial direction D2. More specifically, that portion of gap region 5 which is formed by end edge $2c$ of protrusion $2h$ of first side block 2 and end edge $3c$ of second side block 3 is formed so as to become wider as one proceeds toward the interior in the tire radial direction D2.

Furthermore, while there is no particular limitation with respect thereto, in accordance with the present embodiment, main portion $2f$ of first side block 2 is disposed at a location which is toward the exterior in the tire width direction D1 from main portion $3f$ of second side block 3. That is, the amount by which main portion $2f$ of first side block 2 protrudes beyond profile surface (reference surface) S2 is greater than the amount by which main portion $3f$ of second side block 3 protrudes beyond profile surface S2. At FIG. 4 and FIG. 5 (and the same is true of FIG. 1), note that profile surface S2 is indicated by a double-dash chain line.

Furthermore, while there is no particular limitation with respect thereto, in accordance with the present embodiment, the amount by which recesses $2d$, $2e$ of first side block 2 are recessed relative to main portion $2f$ is greater than the amount by which convexities $3d$, $3e$ of second side block 3 protrude from main portion $3f$. More specifically, the maximum value of the amount by which recesses $2d$, $2e$ of first side block 2 are recessed relative to main portion 2f is greater than the maximum value of the amount by which convexities 3d, 3e of second side block 3 protrude from main portion 3f.

Note that the foregoing respective dimensions, positional relationships, relative magnitudes, and so forth should be understood to be as measured under normal conditions when tire 1 mounted on a normal rim and inflated to normal internal pressure is under no load. A normal rim is that particular rim which is specified for use with a particular tire 1 in the context of the body of standards that contains the standard that applies to the tire 1 in question, this being referred to, for example, as a standard rim in the case of JATMA, or a measuring rim in the cases of TRA and ETRTO.

Furthermore, normal internal pressure is that air pressure which is specified for use with a particular tire 1 in the context of the body of standards that contains the standard that applies to the tire 1 in question, this being "maximum air pressure" in the case of JATMA, the maximum value listed at the table entitled "Tire Load Limits at Various Cold Inflation Pressures" in the case of TRA, or "inflation pressure" in the case of ETRTO.

Constitution of pneumatic tire 1 associated with the present embodiment is as described above; action of pneumatic tire 1 associated with the present embodiment is described below.

For example, when the terrain is sandy or muddy, for traction to be produced at side blocks 2, 3, it will be necessary to cause shearing of sand or mud, which tend to flow. In this regard, because first side blocks 2 comprise recesses 2d, 2e, some of the sand or mud will, for example, enter the interior of recesses 2d, 2e. This being the case, because the sand or mud will be subjected to shearing by recesses 2d, 2e of first side block 2, it will be possible to cause traction to be produced at first side blocks 2.

Moreover, because the angle $\theta 1$ by which end edge 2c of first side block 2 is inclined with respect to the tire radial direction D2 (i.e., the first angle of inclination) is small, some of the sand or mud will cling to end edge 2c. This being the case, because the sand or mud will be subjected to shearing by end edge 2c of first side block 2, it will be even more possible to cause traction to be produced at first side blocks 2.

Moreover, because the inner end portion in the tire radial direction D2 of gap region 5 grows wider as one proceeds toward the interior in the tire radial direction D2, it will be possible to cause sand or mud which clings to end edge 2c of first side block 2 to be effectively expelled from the inner end portion in the tire radial direction D2 of gap region 5. In particular, because the angle $\theta 2$ by which end edge 3c of second side block 3 is inclined with respect to the tire radial direction D2 (i.e., the second angle of inclination) is large, it will be possible to cause sand or mud at the interior of gap region 5 to be definitively expelled from the inner end portion in the tire radial direction D2 of gap region 5.

This being the case, because sand and/or mud will, for example, keep being subjected to shearing by end edges 2c of first side blocks 2, it will be possible to cause traction to be produced at first side blocks 2. Thus, when for example driving over sandy or muddy terrain or the like, because the sand or mud will be subjected to shearing by end edges 2c and recesses 2d, 2e of first side blocks 2, it will be possible to efficiently cause traction to be produced at first side blocks 2.

On the other hand, because second side blocks 3 comprise not only end edges 3c but also convexities 3d, 3e, it will be the case when for example driving over rocky terrain that not only end edges 3c but also convexities 3d, 3e will catch on rocks. This being the case, it will be possible to cause traction to be produced at second side blocks 3. Moreover, because the angle $\theta 2$ by which end edge 3c of second side block 3 is inclined with respect to the tire radial direction D2 (i.e., the second angle of inclination) is large, the length of end edge 3c of second side block 3 will be large.

Thus, when for example driving over rocky terrain, because end edges 3c and convexities 3d, 3e of second side blocks 3 will catch on rocks, it will be possible to efficiently cause traction to be produced at second side blocks 3. Accordingly, it will be possible to efficiently cause traction to be produced at first side blocks 2 when driving over sandy or muddy terrain or the like, and it will be possible to efficiently cause traction to be produced at second side blocks 3 when driving over rocky terrain.

In addition, because convexities 3d, 3e are arranged at roughly the same location(s) in the tire radial direction D2 as a portion of recesses 2d, 2e, this means that recesses 2d, 2e and convexities 3d, 3e will be arranged at the same height from the road surface when tire 1 is in contact with the ground. Accordingly, it will be possible to cause traction to be produced in well-balanced fashion regardless of the conditions of the road over which ridden; i.e., regardless of the type of road over which ridden (e.g., sandy, muddy, or rocky) and regardless of the location relative to the ground (e.g., depth of sand, depth of mud, height of rocks).

It should be noted that because first side block 2 comprises a plurality of outward facing surfaces 2i, 2j, 2k that are respectively arranged so as to be mutually separated in the tire radial direction D2, this means that the plurality of outward facing surfaces 2i, 2j, 2k will be arranged at different heights from the road surface when tire 1 is in contact with the ground. As a result, because when for example driving over rocky terrain, outward facing surfaces 2i, 2j, 2k of first side blocks 2 will catch on rocks of various different heights, it will be possible to efficiently cause traction to be produced at first side blocks 2.

Accordingly, at first side blocks 2, it will be possible to efficiently cause traction to be produced by recesses 2d, 2e and end edges 2c when for example driving over sandy or muddy terrain or the like, and it will be possible to efficiently cause traction to be produced by outward facing surfaces 2i, 2j, 2k when for example driving over rocky terrain or the like. It will therefore be possible to cause traction to be produced at first side blocks 2 in well-balanced fashion regardless of the conditions of the road over which ridden; i.e., regardless of the type of road over which ridden (e.g., sandy, muddy, or rocky).

On the other hand, because second side blocks 3 comprise not only convexities 3d, 3e but also recesses 3h, some of the sand or mud will, for example, enter the interiors of recesses 3h. What is more, at second side blocks 3, because recesses 3h are arranged at locations toward the exterior in the tire radial direction D2 from convexities 3d, 3e, recesses 3h will be arranged near the road surface when tire 1 is in contact with the ground. In addition, when for example driving over sandy or muddy terrain, because the sand or mud will be subjected to shearing by recesses 3h, it will be possible to efficiently cause traction to be produced at second side blocks 3.

Accordingly, at second side blocks 3, it will be possible to efficiently cause traction to be produced by convexities 3d, 3e and end edges 3c when for example driving over rocky terrain or the like, and it will be possible to efficiently cause traction to be produced by recesses 3h when for example driving over sandy or muddy terrain or the like. It will therefore be possible to cause traction to be produced at second side blocks 3 in well-balanced fashion regardless of the conditions of the road over which ridden; i.e., regardless of the type of road over which ridden (e.g., sandy, muddy, or rocky).

Note that the foregoing action has been described by way of example, the action of tire 1 not being limited to the foregoing action. For example when driving over sandy or muddy terrain or the like, it is possible to efficiently cause traction to be produced at side blocks 2, 3 by outward facing surfaces 2*i*, 2*j*, 2*k* of first side blocks 2, and end edges 3*c* and convexities 3*d*, 3*e* of second side blocks 3. Furthermore, for example when driving over rocky terrain or the like, it is possible to efficiently cause traction to be produced at side blocks 2, 3 by end edges 2*c* and recesses 2*d*, 2*e* of first side blocks 2, and recesses 3*h* of second side blocks 3.

As described above, the pneumatic tire 1 of the embodiment includes at least one sidewall region 12 extending in a tire radial direction D2;

wherein the at least one sidewall region 12 comprises a plurality of side blocks 2, 3 that are arrayed in a tire circumferential direction D3;

wherein the plurality of side blocks 2, 3 include a first side block 2 and a second side block 3 that are adjacent in the tire circumferential direction D3;

wherein the first side block 2 comprises a first recess 2*d* that is recessed in a tire width direction D1 and that is disposed at a location which is separated from an edge 2*c* of an end in the tire circumferential direction D3 of the first side block 2; and wherein the second side block 3 comprises a first convexity 3*d* that protrudes in the tire width direction D1 and that is disposed at a location which is separated from an edge 3*c* of an end in the tire circumferential direction D3 of the second side block 3.

In accordance with such constitution, when for example driving over sandy or muddy terrain or the like, traction will tend to be produced at first side blocks 2 due to first recesses 2*d*. Furthermore, for example when driving over rocky terrain or the like, traction will tend to be produced at second side blocks 3 due to first convexities 3*d*. Accordingly, it will be possible to cause traction to be produced in well-balanced fashion regardless of the conditions of the road over which ridden.

Further, in the pneumatic tire 1 of the embodiment, at least a portion of the first recess 2*d* and at least a portion of the first convexity 3*d* are arranged at a same location in the tire radial direction D2.

In accordance with such constitution, first recesses 2*d* of first side blocks 2 and first convexities 3*d* of second side blocks 3 will be arranged at the same height from the road surface when tire 1 is in contact with the ground. Accordingly, it will be possible to cause traction to be produced in even more well-balanced fashion regardless of the conditions of the road over which ridden.

Further, in the pneumatic tire 1 of the embodiment, an first angle θ1 of inclination by which the edge 2*c* of the end in the tire circumferential direction D3 of the first side block 2 is inclined with respect to the tire radial direction D2 is less than an second angle θ2 of inclination by which the edge 3*c* of the end in the tire circumferential direction D3 of the second side block 3 is inclined with respect to the tire radial direction D2.

In accordance with such constitution, because the angle θ1 by which edge 2*c* of end in the tire circumferential direction D3 of first side block 2 is inclined with respect to the tire radial direction D2 is small, traction will tend to be produced at first side blocks 2 due to end edges 2*c*. On the other hand, because the angle θ2 by which edge 3*c* of end in the tire circumferential direction D3 of second side block 3 is inclined with respect to the tire radial direction D2 is large, it is possible to increase the length of end edge 3*c* of second side block 3.

Further, in the pneumatic tire 1 of the embodiment, the first side block 2 further comprises an outward facing surface 2*i*, 2*j*, 2*k* which faces the exterior in the tire radial direction D2.

In accordance with such constitution, when for example driving over rocky terrain or the like, traction will tend to be produced at first side blocks 2 due to outward facing surfaces 2*i*, 2*j*, 2*k*. As a result, it will be possible to cause traction to be produced in well-balanced fashion at first side blocks 2 regardless of the conditions of the road over which ridden.

Further, in the pneumatic tire 1 of the embodiment, the first side block 2 comprises a first outward facing surface 2*i* (2*j*; 2*k*) and a second outward facing surface 2*j*, 2*k* (2*k*, 2*i*; 2*i*, 2*j*) which respectively face the exterior in the tire radial direction D2; and the first outward facing surface 2*i* (2*j*; 2*k*) is separated from the second outward facing surface 2*j*, 2*k* (2*k*, 2*i*; 2*i*, 2*j*) in the tire radial direction D2.

In accordance with such constitution, first outward facing surface(s) 2*i* (2*j*; 2*k*) and second outward facing surface(s) 2*j*, 2*k* (2*k*, 2*i*; 2*i*, 2*j*) will be arranged at different heights from the road surface when tire 1 is in contact with the ground. As a result, for example when driving over rocky terrain or the like, there will be an even greater tendency for traction to be produced at first side blocks 2 due to outward facing surfaces 2*i*, 2*j*, 2*k*. As a result, it will be possible to cause traction to be produced in even more well-balanced fashion at first side blocks 2 regardless of the conditions of the road over which ridden.

Further, in the pneumatic tire 1 of the embodiment, the second side block 3 comprises a recess 3*h* that is recessed in the tire width direction D1 and that is disposed at a location which is separated from the edge 3*c* of the end in the tire circumferential direction D3 of the second side block 3.

In accordance with such constitution, when for example driving over sandy or muddy terrain or the like, traction will tend to be produced at second side blocks 3 due to recesses 3*h*. As a result, it will be possible to cause traction to be produced in well-balanced fashion at second side blocks 3 regardless of the conditions of the road over which ridden.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of pneumatic tire 1 associated with the foregoing embodiment is such that at least a portion of recesses 2*d*, 2*e* of first side blocks 2 and at least a portion of convexities 3*d*, 3*e* of second side blocks 3 are arranged at the same location(s) in the tire radial direction D2. However, pneumatic tire 1 is not limited to such constitution.

For example, it is also possible to adopt a constitution in which recesses 2*d*, 2*e* of first side blocks 2 and convexities 3*d*, 3*e* of second side blocks 3 are arranged at different locations in the tire radial direction D2. More specifically, it is also possible to adopt a constitution in which recesses 2d, 2e of first side blocks 2 are separated in the tire radial direction D2 from convexities 3d, 3e of second side blocks 3.

(2) Furthermore, the constitution of pneumatic tire 1 associated with the foregoing embodiment is such that convexities 3d, 3e of second side blocks 3 are arranged at the same location(s) in the tire radial direction D2 as a portion of recesses 2d, 2e of first side blocks 2. However, pneumatic tire 1 is not limited to such constitution.

For example, it is also possible to adopt a constitution in which recesses 2d, 2e of first side blocks 2 are arranged at the same location(s) in the tire radial direction D2 as a portion of convexities 3d, 3e of second side blocks 3. Furthermore, for example, it is also possible to adopt a constitution in which convexities 3d, 3e of second side blocks 3 are arranged at the same location(s) in the tire radial direction D2 as all of recesses 2d, 2e of first side blocks 2.

(3) Furthermore, the constitution of pneumatic tire 1 associated with the foregoing embodiment is such that first angle of inclination θ1 by which edge 2c of end in the tire circumferential direction D3 of first side block 2 is inclined with respect to the tire radial direction D2 is less than second angle of inclination θ2 by which edge 3c of end in the tire circumferential direction D3 of second side block 3 is inclined with respect to the tire radial direction D2. However, pneumatic tire 1 is not limited to such constitution. For example, it is also possible to adopt a constitution in which said first angle of inclination θ1 is greater than said second angle of inclination θ2.

(4) Furthermore, the constitution of pneumatic tire 1 associated with the foregoing embodiment is such that first side block 2 comprises a plurality of outward facing surfaces 2i, 2j, 2k which face the exterior in the tire radial direction D2. However, pneumatic tire 1 is not limited to such constitution. It is also possible, for example, to adopt a constitution in which first side block 2 comprises one outward facing surface 2i, 2j, 2k; and it is also possible, for example, to adopt a constitution in which first side block 2 does not comprise outward facing surface(s) 2i, 2j, 2k.

(5) Furthermore, the constitution of pneumatic tire 1 associated with the foregoing embodiment is such that prescribed outward facing surface(s) 2i (2j; 2k) is separated in the tire radial direction D2 from at least one other outward facing surface 2j, 2k (2k, 2i; 2i, 2j). However, pneumatic tire 1 is not limited to such constitution. For example, it is also possible to adopt a constitution in which all of the outward facing surfaces 2i, 2j, 2k are arranged at the same location in the tire radial direction D2.

(6) Furthermore, the constitution of pneumatic tire 1 associated with the foregoing embodiment is such that second side block 3 comprises recess 3h that is recessed in the tire width direction D1 and that is disposed at a location which is separated from edges 3c of ends in the tire circumferential direction D3 of second side block 3. However, pneumatic tire 1 is not limited to such constitution. For example, it is also possible to adopt a constitution in which second side block 3 does not comprise recess 3h.

Furthermore, it is also possible, for example, to adopt a constitution in which recess 3h is contiguous with edge 3c of end in the tire circumferential direction D3 of second side block 3. Furthermore, it is also possible, for example, to adopt a constitution in which recess 3h is contiguous with edge 3g of the inner end in the tire radial direction D2 of second side block 3. Furthermore, for example, it is also possible to adopt a constitution in which recess 3h is arranged at a location toward the interior in the tire radial direction D2 from convexities 3d, 3e.

(7) Furthermore, the constitution of pneumatic tire 1 is such that first side blocks 2 and second side blocks 3 are arranged in alternating fashion in the tire circumferential direction D3. However, pneumatic tire 1 is not limited to such constitution.

For example, it is also possible to adopt a constitution in which a portion of first side blocks 2, 2 (and/or a portion of second side blocks 3, 3) are mutually adjacent in the tire circumferential direction D3. Furthermore, it is also possible, for example, to adopt a constitution in which the plurality of side blocks 2, 3 include other side block(s) of shape different from that of first side block 2 and that of second side block 3.

(8) Furthermore, at pneumatic tire 1, the constitution may be such that first and second side blocks 2, 3 are provided at only one of the sidewall regions 12, or the constitution may be such that these are provided at both sidewall regions 12. While there is no particular limitation with respect thereto, it is also possible, for example, to adopt a constitution in which first and second side blocks 2, 3 are at least provided at the sidewall region 12 which of the two sidewall regions 12 is the sidewall region 12 that is arranged so as to be toward the exterior when mounted on a vehicle.

The invention claimed is:

1. A pneumatic tire comprising at least one sidewall region extending in a tire radial direction;
    wherein the at least one sidewall region comprises a plurality of side blocks that are arrayed in a tire circumferential direction;
    wherein the plurality of side blocks include a first side block and a second side block that are adjacent in the tire circumferential direction;
    wherein the first side block comprises a first recess that is recessed from an outside surface of the first side block in a tire width direction and that is disposed at a location which is separated from an edge of an end in the tire circumferential direction of the first side block, the outside surface of the first side block being a first outside surface;
    wherein the second side block comprises a first convexity that protrudes from an outside surface of the second side block in the tire width direction and that is disposed at a location which is separated from an edge of both ends in the tire circumferential direction of the second side block, the outside surface of the second side block being a second outside surface,
    the first side block comprises a first main portion that has the first outside surface,
    the first outside surface is placed on an outer end of the first main portion in the tire width direction and is formed so as to be planar,
    the first recess is recessed relative to the first outside surface in the tire width direction,
    the second side block comprises a second main portion that has the second outside surface,
    the second outside surface is placed on an outer end of the second main portion in the tire width direction and is formed so as to be planar, and
    the first convexity protrudes from the second outside surface in the tire width direction.

2. The pneumatic tire according to claim 1 wherein at least a portion of the first recess and at least a portion of the first convexity are arranged at a same location in the tire radial direction.

3. The pneumatic tire according to claim 1 wherein
a first angle of inclination by which the edge of the end in the tire circumferential direction of the first side block is inclined with respect to the tire radial direction is less than a second angle of inclination by which the edge of one of the ends in the tire circumferential direction of the second side block is inclined with respect to the tire radial direction.

4. The pneumatic tire according to claim 1 wherein
the first side block further comprises an outward facing surface which faces the exterior in the tire radial direction.

5. The pneumatic tire according to claim 1 wherein
the first side block comprises a first outward facing surface and a second outward facing surface which respectively face the exterior in the tire radial direction; and
the first outward facing surface is separated from the second outward facing surface in the tire radial direction.

6. The pneumatic tire according to claim 1 wherein
the first side block comprises a first outward facing surface, a second outward facing surface, and a third outward facing surface which respectively face the exterior in the tire radial direction; and
the first outward facing surface, the second outward facing surface, and the third outward facing surface are respectively separated from each other in the tire radial direction.

7. The pneumatic tire according to claim 1 wherein
the second side block comprises a recess that is recessed from the second outside surface in the tire width direction and that is disposed at a location which is separated from the edge of the both ends in the tire circumferential direction of the second side block.

8. The pneumatic tire according to claim 1 wherein the at least one sidewall region comprises an annular projection that extends in the tire circumferential direction between the first side block and the second side block;
the first side block comprises a first inner portion which is arranged toward the interior in the tire radial direction from the annular projection, and a first outer portion which is arranged toward the exterior in the tire radial direction from the annular projection;
the second side block comprises a second inner portion which is arranged toward the interior in the tire radial direction from the annular projection, and a second outer portion which is arranged toward the exterior in the tire radial direction from the annular projection;
the first recess is arranged at the first inner portion; and
the first convexity is arranged at the second inner portion.

9. The pneumatic tire according to claim 8 wherein
the first side block further comprises a second recess that is recessed from the first outside surface in the tire width direction and that is disposed at a location which is separated from an edge of an end in the tire circumferential direction of the first side block;
the second recess is arranged at the first outer portion;
the second side block further comprises a second convexity that protrudes from the second outside surface in the tire width direction and that is disposed at a location which is separated from the edge of the both ends in the tire circumferential direction of the second side block; and
the second convexity is arranged at the second outer portion.

10. The pneumatic tire according to claim 9 wherein
at least a portion of the first recess and at least a portion of the first convexity are arranged at a same location in the tire radial direction; and
at least a portion of the second recess and at least a portion of the second convexity are arranged at a same location in the tire radial direction.

11. The pneumatic tire according to claim 9 wherein
the second side block further comprises a third recess that is recessed from the second outside surface in the tire width direction and that is disposed at a location which is separated from the edge of the both ends in the tire circumferential direction of the second side block; and
the third recess is arranged at the second outer portion.

12. The pneumatic tire according to claim 11 wherein
the third recess is arranged toward the exterior in the tire radial direction from the second convexity.

13. The pneumatic tire according to claim 12 wherein
at least a portion of the first recess and at least a portion of the first convexity are arranged at a same location in the tire radial direction;
at least a portion of the second recess and at least a portion of the second convexity are arranged at a same location in the tire radial direction; and
at least a portion of the third recess and at least a portion of the second recess are arranged at a same location in the tire radial direction.

14. The pneumatic tire according to claim 9 wherein depth of the second recess is greater than height of the second convexity.

15. The pneumatic tire according to claim 9 wherein
depth of the first recess is greater than height of the first convexity; and
depth of the second recess is greater than height of the second convexity.

16. The pneumatic tire according to claim 1 wherein
depth of the first recess is greater than height of the first convexity.

17. A pneumatic tire comprising at least one sidewall region extending in a tire radial direction;
wherein the at least one sidewall region comprises a plurality of side blocks that are arrayed in a tire circumferential direction;
wherein the plurality of side blocks include a first side block and a second side block that are adjacent in the tire circumferential direction;
wherein the first side block comprises a first recess that is recessed in a tire width direction and that is disposed at a location which is separated from an edge of an end in the tire circumferential direction of the first side block;
wherein the second side block comprises a first convexity that protrudes in the tire width direction and that is disposed at a location which is separated from an edge of an end in the tire circumferential direction of the second side block, and
wherein the first side block further comprises a protrusion which protrudes in the tire circumferential direction at an inner end thereof in the tire radial direction.

18. The pneumatic tire according to claim 17 wherein
the at least one sidewall region comprises an annular projection that extends in the tire circumferential direction between the first side block and the second side block;
the second side block comprises an inner portion which is arranged toward the interior in the tire radial direction from the annular projection; and a dimension in the tire circumferential direction of the inner portion decreases as one proceeds toward the interior in the tire radial direction.

19. The pneumatic tire according to claim 18 wherein the at least one sidewall region comprises a gap which is formed between the protrusion and the inner portion; and a dimension in the tire circumferential direction of the gap increases as one proceeds toward the interior in the tire radial direction.

20. A pneumatic tire comprising at least one sidewall region extending in a tire radial direction;

wherein the at least one sidewall region comprises a plurality of side blocks that are arrayed in a tire circumferential direction;

wherein the plurality of side blocks include a first side block and a second side block that are adjacent in the tire circumferential direction;

wherein the first side block comprises a first recess that is recessed in a tire width direction and that is disposed at a location which is separated from an edge of an end in the tire circumferential direction of the first side block;

wherein the second side block comprises a first convexity that protrudes in the tire width direction and that is disposed at a location which is separated from an edge of an end in the tire circumferential direction of the second side block, and wherein the first side block further comprises a first protrusion which protrudes toward a first side in the tire circumferential direction at an inner end thereof in the tire radial direction, and a second protrusion which protrudes toward a second side in the tire circumferential direction at the inner end thereof in the tire radial direction.

\* \* \* \* \*